(12) United States Patent
Umemoto et al.

(10) Patent No.: US 10,450,923 B2
(45) Date of Patent: Oct. 22, 2019

(54) EXHAUST GAS CONTROL APPARATUS FOR INTERNAL COMBUSTION ENGINE AND CONTROL METHOD FOR EXHAUST GAS CONTROL APPARATUS

(71) Applicants: TOYOTA JIDOSHA KABUSHIKI KAISHA, Toyota-shi, Aichi-ken (JP); THE DOSHISHA, Kyoto-shi, Kyoto (JP)

(72) Inventors: Kazuhiro Umemoto, Ebina (JP); Toshihiro Mori, Gotemba (JP); Hiromasa Nishioka, Susono (JP); Jiro Senda, Kyotanabe (JP); Eriko Matsumura, Kyotanabe (JP)

(73) Assignees: Toyota Jidosha Kabushiki Kaisha, Toyota-shi, Aichi-ken (JP); The Doshisha, Kyoto-shi, Kyoto (JP)

( * ) Notice: Subject to any disclaimer, the term of this patent is extended or adjusted under 35 U.S.C. 154(b) by 12 days.

(21) Appl. No.: 15/807,808

(22) Filed: Nov. 9, 2017

(65) Prior Publication Data

US 2018/0128143 A1  May 10, 2018

(30) Foreign Application Priority Data

Nov. 10, 2016  (JP) .................................. 2016-219975

(51) Int. Cl.
*F01N 3/20* (2006.01)
*F01N 3/08* (2006.01)
(Continued)

(52) U.S. Cl.
CPC ........... *F01N 3/208* (2013.01); *F01N 3/0814* (2013.01); *F01N 3/0842* (2013.01);
(Continued)

(58) Field of Classification Search
CPC .... F01N 3/0814; F01N 3/0821; F01N 3/0842; F01N 3/206; F01N 3/2066; F01N 3/2073;
(Continued)

(56) References Cited

U.S. PATENT DOCUMENTS

2010/0275581 A1  11/2010  Wada et al.
2011/0270504 A1  11/2011  Barasa
(Continued)

FOREIGN PATENT DOCUMENTS

CN  101535619 A  9/2009
CN  102989316 A  3/2013
(Continued)

*Primary Examiner* — Mark A Laurenzi
*Assistant Examiner* — Mickey H France
(74) *Attorney, Agent, or Firm* — Finnegan, Henderson, Farabow, Garrett & Dunner, LLP

(57) ABSTRACT

An exhaust gas control apparatus for an internal combustion engine is provided. The exhaust gas control apparatus is equipped with a NOx reduction catalyst, a reducing agent tank, a reducing agent supply device, a booster, a heater, and an electronic control unit. The electronic control unit is configured to perform control of raising a temperature of a reducing agent to a first target temperature such that the reducing agent supplied by the reducing agent supply device is brought into a gas-liquid mixed state in an exhaust passage, when energy of exhaust gas is lower than a first threshold.

6 Claims, 10 Drawing Sheets

(51) Int. Cl.
*F01N 3/36* (2006.01)
*F01N 9/00* (2006.01)
*F01N 11/00* (2006.01)
*F01N 13/00* (2010.01)

(52) U.S. Cl.
CPC ............ *F01N 3/2066* (2013.01); *F01N 3/36* (2013.01); *F01N 9/00* (2013.01); *F01N 11/005* (2013.01); *F01N 13/009* (2014.06); F01N 2560/06 (2013.01); F01N 2610/02 (2013.01); F01N 2610/03 (2013.01); F01N 2610/10 (2013.01); F01N 2610/105 (2013.01); F01N 2610/1406 (2013.01); F01N 2610/1433 (2013.01); F01N 2900/1404 (2013.01); F01N 2900/1406 (2013.01); F01N 2900/1631 (2013.01); F01N 2900/1808 (2013.01); F01N 2900/1811 (2013.01); Y02T 10/24 (2013.01); Y02T 10/47 (2013.01)

(58) Field of Classification Search
CPC ......... F01N 3/208; F01N 3/36; F01N 13/009; F01N 2240/16; F01N 2560/06; F01N 2610/01–2610/03; F01N 2610/06; F01N 2610/10; F01N 2610/102; F01N 2610/105; F01N 2610/107; F01N 2900/1404; F01N 2900/1406; F01N 2900/1631; F01N 2900/1806; F01N 2900/1808; F01N 2900/1811; F01N 2610/1433; F01N 2610/1446–2610/1493
USPC ......... 60/272, 273, 282, 284–287, 291, 295, 60/301, 303
See application file for complete search history.

(56) References Cited

U.S. PATENT DOCUMENTS

2013/0064744 A1* 3/2013 Yacoub .................. F01N 3/206
423/212
2013/0255235 A1 10/2013 Hodgson et al.

FOREIGN PATENT DOCUMENTS

| | | |
|---|---|---|
| CN | 202789025 U | 3/2013 |
| DE | 10 2011 018 453 A1 | 11/2011 |
| JP | 2004-324502 A | 11/2004 |
| JP | 2005-291086 A | 10/2005 |
| JP | 2006-214337 | 8/2006 |
| JP | 2010-65581 | 3/2010 |
| KR | 10-2012-0135919 A | 12/2012 |
| WO | WO2008/056242 A2 | 5/2008 |

\* cited by examiner

EXHAUST GAS CONTROL APPARATUS FOR INTERNAL COMBUSTION ENGINE AND CONTROL METHOD FOR EXHAUST GAS CONTROL APPARATUS

INCORPORATION BY REFERENCE

The disclosure of Japanese Patent Application No. 2016-219975 filed on Nov. 10, 2016 including the specification, drawings and abstract is incorporated herein by reference in its entirety.

BACKGROUND

1. Technical Field

The disclosure relates to an exhaust gas control apparatus for an internal combustion engine, and a control method for the exhaust gas control apparatus.

2. Description of Related Art

It is disclosed in Japanese Patent Application Publication No. 2006-214337 (JP 2006-214337 A) that an exhaust passage of an internal combustion engine is provided with a NOx reduction catalyst, and that NOx are reduced in the NOx reduction catalyst by supplying a reducing agent to the NOx reduction catalyst. In Japanese Patent Application Publication No. 2006-214337 (JP 2006-214337 A), fuel is supplied, as the reducing agent, to a NOx storage reduction catalyst.

When the exhaust gas temperature in an exhaust pipe is low and the energy of exhaust gas is low, the reducing agent supplied into the exhaust pipe is supplied in a liquid state to the NOx reduction catalyst. In Japanese Patent Application Publication No. 2006-214337 (JP 2006-214337 A), high-temperature fuel pressurized by a high-pressure pump is introduced into the exhaust pipe, so the fuel is gasified at an early stage through the phenomenon of boiling under reduced pressure. It is described that the performance of NOx reduction can thus be enhanced.

SUMMARY

The inventor of the present application has found out, as a result of strenuous studies, that NOx can be more effectively reduced by supplying the reducing agent in a gas-liquid mixed state to the NOx reduction catalyst instead of supplying the reducing agent in a liquid state or a gaseous state thereto. This phenomenon is considered to be based on a mechanism that will be described below.

When the reducing agent gasified in the exhaust pipe flows into the NOx reduction catalyst, reducing components are supplied to the entire catalyst. In particular, in the case where the NOx reduction catalyst is a NOx storage reduction catalyst, the gasified reducing agent is mainly used to raise the temperature of the catalyst through a reaction with the oxygen that has adhered to the catalyst. On the other hand, the reducing agent in a droplet state can locally enhance the concentration of the reducing components on the catalyst. Therefore, the oxygen on the catalyst is removed by the gasified reducing agent, and the concentration of the reducing components on the catalyst is locally enhanced by the reducing agent in a droplet state. Thus, a NOx reduction reaction in the NOx storage reduction catalyst can be accelerated. Besides, in the case where the NOx reduction catalyst is a NOx selective catalytic reduction catalyst (an SCR catalyst) as well, the NOx reduction reaction in the SCR catalyst can be accelerated by locally enhancing the concentration of ammonia on the catalyst by supplying urea water in a droplet state to the catalyst while supplying gaseous ammonia produced through the hydrolysis of urea water as the reducing agent to the entire catalyst.

The disclosure provides an exhaust gas control apparatus for an internal combustion engine and a control method for the exhaust gas control apparatus that make it possible to supply a reducing agent in a gas-liquid mixed state to a NOx reduction catalyst when the energy of exhaust gas in an exhaust passage is low.

A first aspect of the disclosure is an exhaust gas control apparatus for an internal combustion engine. The exhaust gas control apparatus includes a NOx reduction catalyst, a reducing agent tank, a reducing agent supply device, a booster, a heater, and an electronic control unit. The NOx reduction catalyst is arranged in an exhaust passage of the internal combustion engine. The reducing agent tank stores a reducing agent. The reducing agent supply device is configured to supply the reducing agent to the exhaust passage upstream of the NOx reduction catalyst in a flow direction of exhaust gas. The booster is configured to boost a pressure of the reducing agent supplied to the reducing agent supply device from the reducing agent tank to a pressure higher than a pressure in the exhaust passage. The heater is configured to heat the reducing agent supplied to the reducing agent supply device from the reducing agent tank. The electronic control unit is configured to control a temperature of the reducing agent by the heater. The electronic control unit is configured to estimate energy of exhaust gas in the exhaust passage. The electronic control unit is configured to perform control of raising the temperature of the reducing agent to a first target temperature such that the reducing agent supplied by the reducing agent supply device is brought into a gas-liquid mixed state in the exhaust passage, when the energy of exhaust gas is lower than a first threshold.

In the exhaust gas control apparatus, the electronic control unit may be configured to execute one of detecting and estimating an exhaust gas temperature in the exhaust passage. The electronic control unit may be configured to estimate the energy of exhaust gas in the exhaust passage based on the exhaust gas temperature.

In the exhaust gas control apparatus, the electronic control unit may be configured to estimate a flow rate of exhaust gas in the exhaust passage. The electronic control unit may be configured to estimate the energy of exhaust gas in the exhaust passage based on the exhaust gas temperature and the flow rate of exhaust gas.

In the exhaust gas control apparatus, the electronic control unit may be configured to raise the temperature of the reducing agent to a second target temperature when the energy of exhaust gas is equal to or higher than the first threshold and lower than a second threshold. The second target temperature may be lower than the first target temperature.

In the exhaust gas control apparatus, the electronic control unit may be configured to raise the temperature of the reducing agent to the first target temperature by gradually raising the temperature of the reducing agent.

In the exhaust gas control apparatus, the electronic control unit may be configured to control supply of the reducing agent by the reducing agent supply device. When the energy of exhaust gas becomes equal to or higher than the first threshold after the temperature of the reducing agent rises to the first target temperature, the electronic control unit may be configured to supply the reducing agent at the first target temperature to the exhaust passage and supply the reducing agent below the first target temperature to the exhaust passage.

In the exhaust gas control apparatus, the electronic control unit may be configured to execute one of detecting and estimating an atmospheric pressure. The electronic control unit may be configured to set at least one of the first target temperature and the first threshold lower when the atmospheric pressure is relatively low than when the atmospheric pressure is relatively high.

A second aspect of the disclosure is a control method for an exhaust gas control apparatus. The exhaust gas control apparatus is provided in an internal combustion engine. The exhaust gas control apparatus includes a NOx reduction catalyst, a reducing agent tank, a reducing agent supply device, a booster, a heater, and an electronic control unit. The NOx reduction catalyst is arranged in an exhaust passage of the internal combustion engine. The reducing agent tank stores a reducing agent. The reducing agent supply device is configured to supply the reducing agent to the exhaust passage upstream of the NOx reduction catalyst in a flow direction of exhaust gas. The booster is configured to boost a pressure of the reducing agent supplied to the reducing agent supply device from the reducing agent tank to a pressure higher than a pressure in the exhaust passage. The heater is configured to heat the reducing agent supplied to the reducing agent supply device from the reducing agent tank. The control method includes: controlling a temperature of the reducing agent by the heater; estimating energy of exhaust gas in the exhaust passage by the electronic control unit; and raising, by the electronic control unit, the temperature of the reducing agent to a first target temperature such that the reducing agent supplied by the reducing agent supply device is brought into a gas-liquid mixed state in the exhaust passage, when the energy of exhaust gas is lower than a first threshold.

According to the aforementioned configuration, the exhaust gas control apparatus for the internal combustion engine that can supply the reducing agent in a gas-liquid mixed state to the NOx reduction catalyst when the energy of exhaust gas in the exhaust passage is low is provided.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
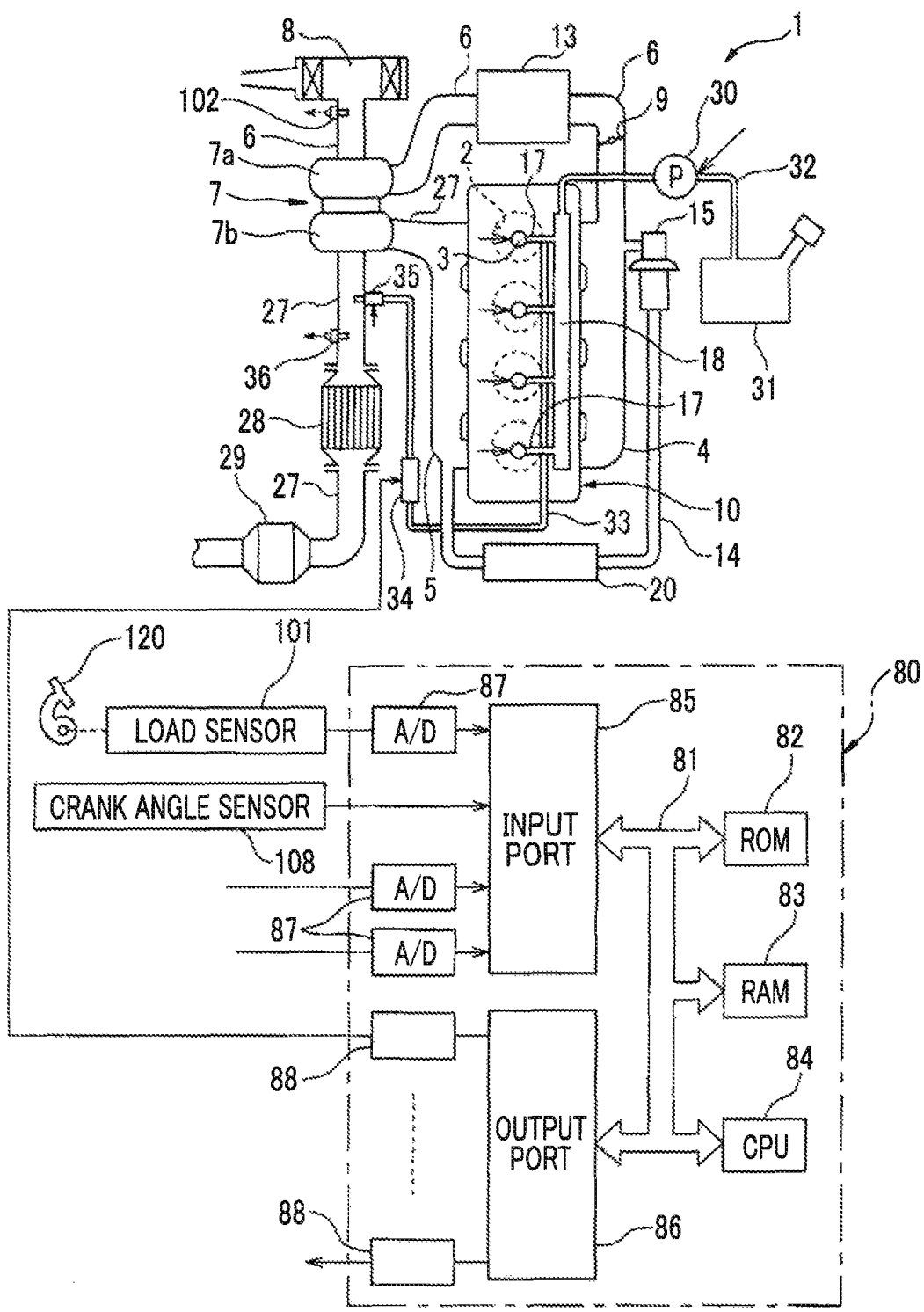
FIG. 1 is a view schematically showing an internal combustion engine that is provided with an exhaust gas control apparatus for the internal combustion engine according to the first embodiment.

The embodiments of the disclosure will be described hereinafter in detail with reference to the drawings. Incidentally, in the following description, like components will be denoted by like reference numerals.

The first embodiment will be described hereinafter with reference to FIGS. 1 to 8.

FIG. 1 is a view schematically showing an internal combustion engine that is provided with an exhaust gas control apparatus for the internal combustion engine according to the first embodiment. An internal combustion engine 1 shown in FIG. 1 is a compression self-ignition internal combustion engine (a diesel engine). The internal combustion engine 1 is mounted in, for example, a vehicle.

Referring to FIG. 1, an engine body is denoted by 10, combustion chambers of respective cylinders are denoted by 2, electronically controlled fuel injection valves that inject fuel into the combustion chambers 2 respectively are denoted by 3, an intake manifold is denoted by 4, and an exhaust manifold is denoted by 5. The intake manifold 4 is coupled to an outlet of a compressor 7a of a turbocharger (a supercharger) 7 via an intake pipe 6. An inlet of the compressor 7a is coupled to an air cleaner 8 via the intake pipe 6. A throttle valve 9 that is driven by a step motor is arranged in the intake pipe 6. Furthermore, a cooling device 13 for cooling intake air flowing through the intake pipe 6 is arranged around the intake pipe 6. In the internal combustion engine 1 shown in FIG. 1, engine coolant is introduced into the cooling device 13, and intake air is cooled by engine coolant. The intake manifold 4 and the intake pipe 6 form an intake passage through which air is introduced into the combustion chambers 2.

On the other hand, the exhaust manifold 5 is coupled to an inlet of a turbine 7b of the turbocharger 7 via an exhaust pipe 27. An outlet of the turbine 7b is coupled to a NOx storage reduction catalyst 28 via the exhaust pipe 27. The NOx storage reduction catalyst 28 is coupled to a diesel particulate filter (a DPF) 29 via the exhaust pipe 27. The exhaust manifold 5 and the exhaust pipe 27 form an exhaust passage through which exhaust gas generated through the combustion of an air-fuel mixture in the combustion chambers 2 is discharged. The DPF 29 collects particulate matters (PM) in exhaust gas, and burns the collected PM to purify the exhaust gas. Incidentally, the NOx storage reduction catalyst 28 will be described later.

The exhaust manifold 5 and the intake manifold 4 are coupled to each other via an exhaust gas recirculation (EGR) passage 14. An electronically controlled EGR control valve 15 is arranged in the EGR passage 14. Besides, an EGR cooling device 20 for cooling the EGR gas flowing through the EGR passage 14 is arranged around the EGR passage 14. In the internal combustion engine 1 shown in FIG. 1, engine coolant is introduced into the EGR cooling device 20, and EGR gas is cooled by engine coolant.

Fuel is supplied into a common rail 18 from a fuel tank 31 via a fuel piping structure 32 by a fuel pump 30. The fuel pump 30 pumps up the fuel in the fuel tank 31, and boosts the pressure of the fuel. The high-pressure fuel supplied into the common rail 18 is supplied to the fuel injection valves 3 via fuel supply pipes 17 respectively. The fuel injection valves 3 inject fuel into the combustion chambers 2 respectively.

Various kinds of control of the internal combustion engine 1 are performed by an electronic control unit (an ECU) 80. The ECU 80 is configured as a digital computer. The ECU 80 is equipped with a read only memory (a ROM) 82, a random access memory (a RAM) 83, a microprocessor (a CPU) 84, an input port 85, and an output port 86, which are connected to one another by a bidirectional bus 81. Outputs of a load sensor 101 and an airflow meter 102 are input to the input port 85 via corresponding AD converters 87 respectively.

The load sensor 101 generates an output voltage proportional to a depression amount of an accelerator pedal 120. Accordingly, the load sensor 101 detects an engine load. The airflow meter 102 is arranged between the air cleaner 8 and the compressor 7a in the intake passage, and detects a flow rate of air flowing through the intake pipe 6. Furthermore, a crank angle sensor 108 that generates an output pulse every time a crankshaft rotates by, for example, 15° is connected to the input port 85. An engine rotational speed is detected by the crank angle sensor 108.

On the other hand, the output port 86 is connected to the fuel injection valves 3, a step motor for driving the throttle valve, the EGR control valve 15, and the fuel pump 30 via corresponding drive circuits 88 respectively.

The internal combustion engine 1 may be a spark ignition internal combustion engine having ignition plugs arranged in combustion chambers, especially a lean air-fuel mixture burn (lean-burn) gasoline engine. The concrete configuration of the internal combustion engine 1 such as the arrangement of cylinders, the configuration of intake and exhaust systems, and the presence/absence of a supercharger may be different from the configuration shown in FIG. 1.

The configuration of the exhaust gas control apparatus for the internal combustion engine 1 according to the first embodiment will be described hereinafter. The exhaust gas control apparatus for the internal combustion engine 1 is equipped with a NOx reduction catalyst that is arranged in an exhaust passage of the internal combustion engine 1. In the present embodiment, the NOx storage reduction catalyst (hereinafter referred to as "an NSR catalyst") 28 is an example of the NOx reduction catalyst. The NSR catalyst 28 is arranged in the exhaust pipe 27 between the turbine 7b of the turbocharger 7 and the DPF 29, in the exhaust passage of the internal combustion engine 1. The NSR catalyst 28 may be arranged downstream of the DPF 29 in a flow direction of exhaust gas. Besides, the NSR catalyst 28 may be integral with the DPF 29.

Figure 2A:
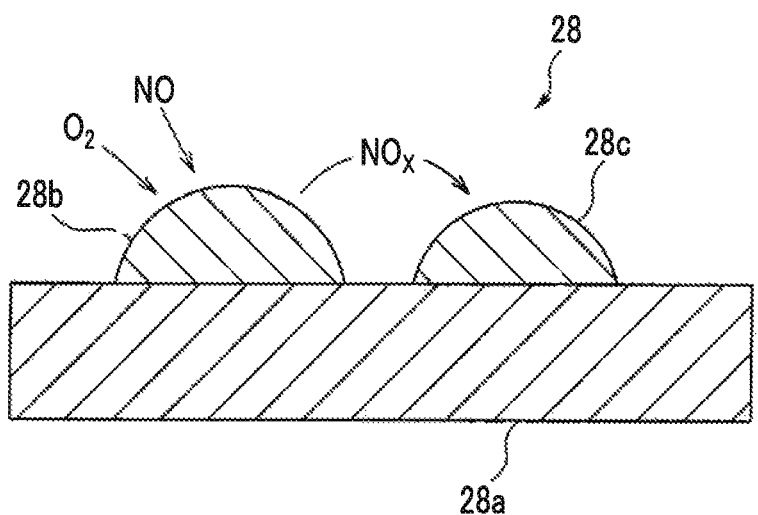
FIG. 2A is a schematic cross-sectional view of a surface region of a catalyst carrier of an NSR catalyst.
Figure 2B:
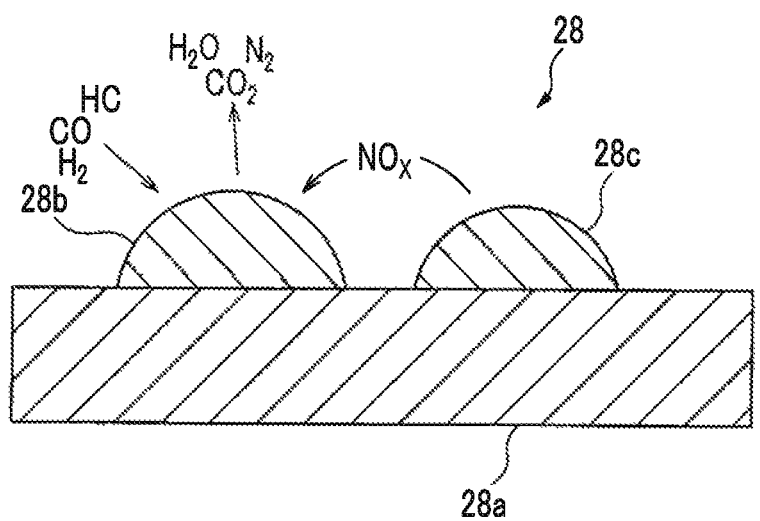
FIG. 2B is a schematic cross-sectional view of the surface region of the catalyst carrier of the NSR catalyst.

The configuration and operation of the NSR catalyst 28 will be briefly described hereinafter with reference to FIGS. 2A and 2B. Each of FIGS. 2A and 2B is a schematic cross-sectional view of a surface region of a catalyst carrier 28a of the NSR catalyst 28. The NSR catalyst 28 includes the catalyst carrier 28a, a noble metal 28b, and an storing substance 28c. The noble metal 28b and the storing substance 28c are carried on the catalyst carrier 28a.

The catalyst carrier 28a is, for example, alumina ($Al_2O_3$). The noble metal 28b is, for example, platinum (Pt). The storing substance 28c is, for example, at least one of an alkali metal such as potassium (K), sodium (Na), lithium (Li) or cesium (Cs), an alkali earth such as barium (Ba) or calcium (Ca), and a rare earth such as lanthanum (La) or yttrium (Y).

As shown in FIG. 2A, in the NSR catalyst 28, when the concentration of oxygen in exhaust gas is high, namely, when the air-fuel ratio of exhaust gas is leaner than a theoretical air-fuel ratio, nitrogen oxide components (NO) contained in exhaust gas are oxidized on the noble metal 28b, and are stored by the storing substance 28c as NOx. On the other hand, as shown in FIG. 2B, in the NSR catalyst 28, when the concentration of oxygen in exhaust gas is low, namely, when the air-fuel ratio of exhaust gas is richer than the theoretical air-fuel ratio, the NOx stored by the storing substance 28c are discharged. The discharged NOx are reduced on the noble metal 28b by reducing components such as hydrogen ($H_2$), carbon monoxide (CO), hydrocarbons (HC) and the like in exhaust gas. Accordingly, the NSR catalyst 28 can reduce the NOx in exhaust gas through repetition of states of FIGS. 2A and 2B.

The exhaust gas control apparatus for the internal combustion engine 1 is further equipped with a reducing agent tank, a reducing agent supply device 35, a booster, and a heater 34. In the present embodiment, fuel is used as a reducing agent. The fuel tank 31 is an example of the reducing agent tank. The fuel is, for example, light oil.

In the present embodiment, a leak fuel piping structure 33 is coupled to the respective fuel injection valves 3. The fuel that has been supplied to the respective fuel injection valves 3 from the common rail 18 and that has not been injected into the combustion chambers 2 is supplied, as the reducing agent, to the reducing agent supply device 35 via the leak fuel piping structure 33. The reducing agent supply device 35 is fixed to the exhaust pipe 27 in such a manner as to supply the reducing agent to the exhaust passage upstream of the NSR catalyst 28 in the flow direction of exhaust gas. In concrete terms, the reducing agent supply device 35 supplies the reducing agent into the exhaust pipe 27 between the turbine 7b of turbocharger 7 and the NSR catalyst 28. Thus, the reducing agent supply device 35 supplies the reducing agent to the NSR catalyst 28 via the exhaust pipe 27.

The reducing agent supply device 35 is, for example, an electronically controlled injection valve that is similar to the fuel injection valves 3. The reducing agent supply device 35 is connected to the output port 86 of the ECU 80 via the corresponding drive circuit 88. The ECU 80 controls the timing of the supply of the reducing agent from the reducing agent supply device 35, and the amount of the reducing agent supplied from the reducing agent supply device 35.

The booster boosts the pressure of the reducing agent supplied to the reducing agent supply device 35 from the fuel tank 31 to a pressure higher than a pressure in the exhaust passage. In the present embodiment, the fuel pump 30 is an example of the booster. The fuel pump 30 boosts the pressure of the fuel supplied to the reducing agent supply device 35 via the leak fuel piping structure 33 to a pressure (e.g., 1.0 Mpa) higher than the pressure in the exhaust pipe 27 (appropriately an atmospheric pressure (101.33 kPa)).

The heater 34 is arranged in the leak fuel piping structure 33, and heats the reducing agent supplied to the reducing agent supply device 35 from the fuel tank 31. The heater 34 is fixed to the leak fuel piping structure 33, for example, in such a manner as to surround an outer periphery of the leak fuel piping structure 33. Incidentally, the heater 34 may be embedded in the leak fuel piping structure 33.

The heater 34 is, for example, a heat generator that generates heat through energization. The heater 34 is connected to the output port 86 of the ECU 80 via the corresponding drive circuit 88. The ECU 80 controls the amount of energization of the heater 34, and hence controls the temperature of the reducing agent in the leak fuel piping structure 33.

The fuel supplied to the fuel injection valves 3 may be supplied to the common rail 18 by an in-tank pump that is arranged in the fuel tank 31, instead of being supplied to the common rail 18 by the fuel pump 30. In this case, the booster that boosts the pressure of the reducing agent may be provided in the fuel piping structure 32 or the leak fuel piping structure 33 separately from the in-tank pump. The reducing agent may be supplied to the reducing agent supply device 35 via a reducing agent piping structure (not shown) that connects the fuel tank 31 and the reducing agent supply device 35 to each other, without passing through the fuel piping structure 32 and the leak fuel piping structure 33. In this case, the booster and the heater are arranged in the reducing agent piping structure. The reducing agent may be stored in a reducing agent tank that is separate from the fuel tank 31.

The exhaust gas control apparatus for the internal combustion engine 1 performs the control of temperature, the estimation of the energy of exhaust gas, and the control of the supply of the reducing agent, by the ECU 80. The ECU 80 controls the heater 34 to adjust the temperature of the reducing agent. The ECU 80 estimates the energy of exhaust gas in the exhaust passage (the exhaust pipe 27 in the present embodiment). The ECU 80 controls the supply of the reducing agent by the reducing agent supply device 35. In concrete terms, the ECU 80 controls the timing of the supply of the reducing agent into the exhaust pipe 27 from the reducing agent supply device 35, and the amount of the reducing agent supplied into the exhaust pipe 27 from the reducing agent supply device 35.

Figure 3:
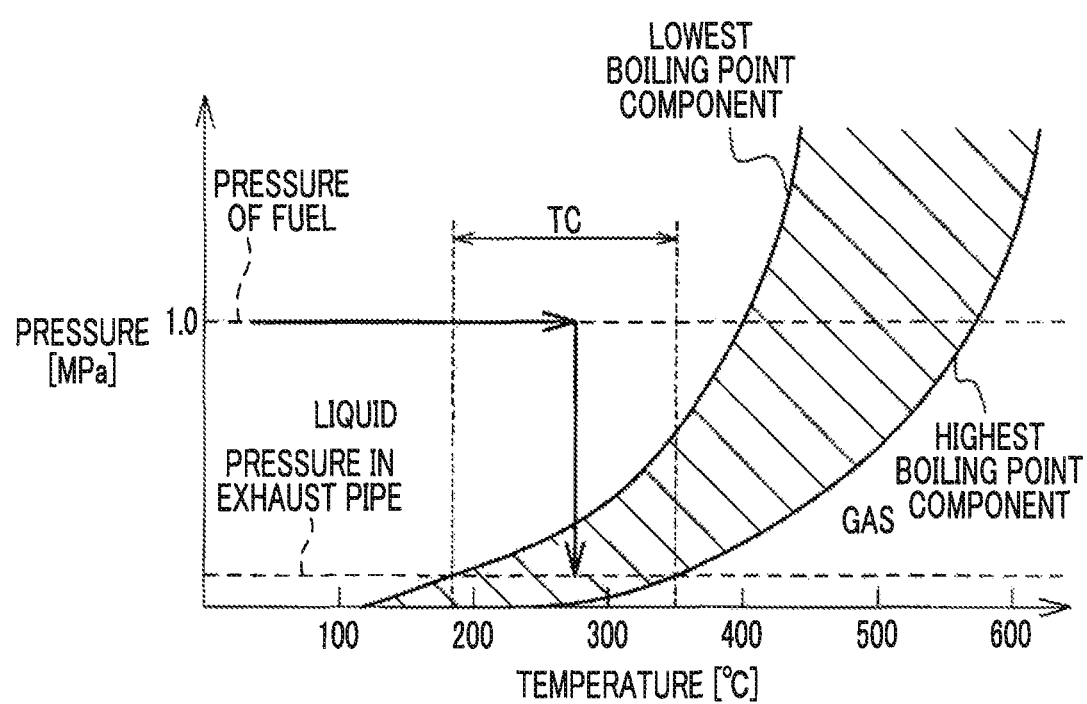
FIG. 3 is a view showing a vapor pressure curve of light oil.

The control of the exhaust gas control apparatus for the internal combustion engine 1 will be described hereinafter. As described above, in the present embodiment, fuel, for example, light oil is used as the reducing agent. FIG. 3 is a view showing a vapor pressure curve of light oil. The light oil contains various components, which have different boiling points. A solid line on the left side of FIG. 3 shows a vapor pressure curve of the lowest boiling point component of the light oil, and a solid line on the right side of FIG. 3 shows a vapor pressure curve of the highest boiling point component of the light oil. At each pressure, the light oil is brought into a liquid state when the temperature thereof is lower than a lowest boiling point, is brought into a gaseous state when the temperature thereof is higher than a highest boiling point, and is brought into a gas-liquid mixed state when the temperature thereof is between the lowest boiling point and the highest boiling point (a hatched part in FIG. 3).

When low-temperature fuel is injected into the exhaust pipe 27 in a state where the temperature in the exhaust pipe 27 is low and the energy of exhaust gas is low, the injected fuel is not gasified by the energy of exhaust gas in the exhaust pipe 27. Therefore, liquid fuel is supplied to the NSR catalyst 28.

However, the inventor of the present application has found out, as a result of strenuous studies, that NOx can be more effectively reduced by supplying fuel in a gas-liquid mixed state to the NSR catalyst 28 instead of supplying liquid fuel or gaseous fuel thereto. This phenomenon is considered to be based on a mechanism that will be described below.

When the reducing agent gasified in the exhaust pipe 27 flows into the NSR catalyst 28, the reducing components are supplied to the entire catalyst. The gasified reducing agent is mainly used to raise the temperature of the catalyst through a reaction with the oxygen that has adhered to the catalyst. On the other hand, the reducing agent in droplets can locally enhance the concentration of the reducing components on the catalyst. Therefore, the reaction of reducing NOx in the NSR catalyst 28 can be accelerated by locally enhancing the concentration of the reducing components on the catalyst by the reducing agent in droplets while removing the oxygen on the catalyst by the gasified reducing agent.

Thus, in the present embodiment, with a view to supplying the fuel in a gas-liquid mixed state to the NSR catalyst 28 when the energy of exhaust gas in the exhaust pipe 27 is low, part of the fuel is boiled under reduced pressure in the exhaust pipe 27. In order to boil part of the fuel under reduced pressure, the fuel pump 30 boosts the pressure of the fuel supplied to the reducing agent supply device 35 to a pressure higher than the pressure in the exhaust pipe 27, and the ECU 80 raises the temperature of the fuel by the heater 34.

In concrete terms, when the estimated energy of exhaust gas is lower than a first threshold, the ECU 80 raises the temperature of fuel to a first target temperature such that the fuel supplied by the reducing agent supply device 35 is brought into a gas-liquid mixed state in the exhaust pipe 27. The first threshold is set to, for example, a lower threshold of the energy of exhaust gas that is needed to partially gasify low-temperature (e.g., up to 30° C.) fuel. The first target temperature is a temperature at which the fuel supplied into the exhaust pipe 27 is brought into a gas-liquid mixed state in the exhaust pipe 27, namely, a temperature in a temperature range between the highest boiling point and lowest boiling point of fuel at the pressure in the exhaust pipe 27.

For example, as indicated by a rightward arrow in FIG. 3, the ECU 80 raises the temperature of the fuel in the leak fuel piping structure 33 by the heater 34. As a result, even in the case where the energy of exhaust gas in the exhaust pipe 27 is low, the fuel supplied into the exhaust pipe 27 changes from a liquid state to a gaseous state through boiling under reduced pressure, as indicated by a downward arrow in FIG. 3. Accordingly, the exhaust gas control apparatus for the internal combustion engine 1 according to the present embodiment can supply the reducing agent in a gas-liquid mixed state to the NOx reduction catalyst in the case where the energy of exhaust gas in the exhaust passage is low, through the aforementioned control.

The ECU 80 may perform feedback control of the amount of energization of the heater 34 based on an output of a temperature sensor that detects a temperature of fuel, such that the temperature of fuel becomes equal to the first target temperature. The temperature sensor is arranged in a reducing agent supply passage (the leak fuel piping structure 33 in the present embodiment) between the heater 34 and the reducing agent supply device 35. The ECU 80 may estimate a temperature of the fuel in the leak fuel piping structure 33 based on an output of an outside air temperature sensor that detects an outside air temperature of the internal combustion engine 1 or a coolant temperature sensor that detects a temperature of coolant for the internal combustion engine 1, and control the amount of energization of the heater 34 based on the estimated temperature of the fuel.

Figure 4:
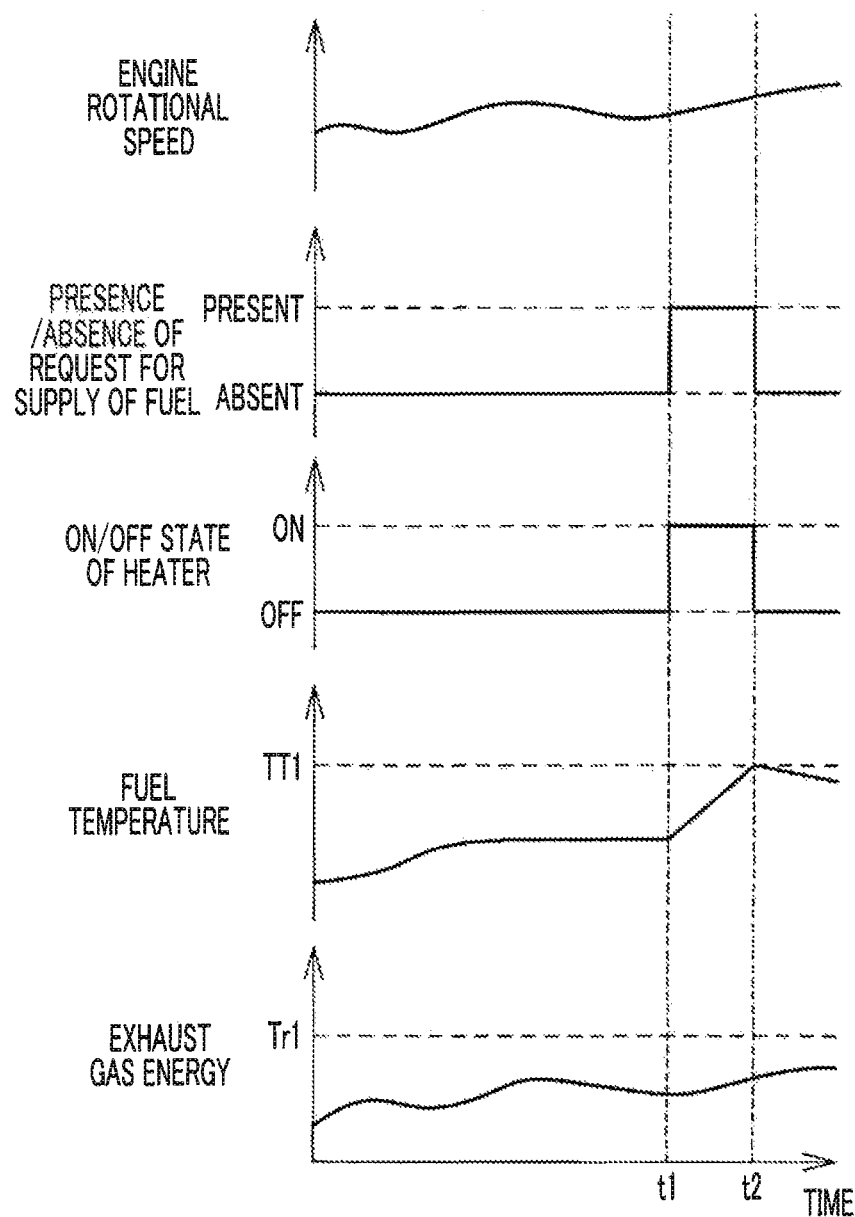
FIG. 4 is a time chart of an engine rotational speed and the like in supplying fuel into an exhaust pipe.

The control of the exhaust gas control apparatus for the internal combustion engine 1 will be concretely described hereinafter with reference to a time chart of FIG. 4. FIG. 4 is a schematic time chart of an engine rotational speed, the presence/absence of a request for the supply of fuel, the on/off state of the heater 34, the temperature of fuel, and the energy of exhaust gas in supplying fuel into the exhaust pipe 27.

In the illustrated example, a request for the supply of fuel into the exhaust pipe 27 is made at a time point t1. The energy of exhaust gas in the exhaust pipe 27 is lower than a first threshold Tr1 at the time point t1. Besides, the heater 34 is off (not energized) until the request for fuel supply is made at the time point t1. Therefore, the temperature of fuel at the time point t1 is lower than a first target temperature TT1. In this state, when fuel is supplied into the exhaust pipe 27, the liquid fuel is supplied to the NSR catalyst 28 without being gasified in the exhaust pipe 27.

Therefore, the heater 34 is turned on at the time point t1 to raise the temperature of fuel to the first target temperature TT1. As a result, the temperature of fuel reaches the first target temperature TT1 at a time point t2.

Fuel is supplied into the exhaust pipe 27 by the reducing agent supply device 35 at the time point t2. Part of the fuel supplied into the exhaust pipe 27 is boiled under reduced pressure in the exhaust pipe 27. As a result, the fuel in a gas-liquid mixed state is supplied to the NSR catalyst 28. When the supply of fuel into the exhaust pipe 27 is ended, the heater 34 is turned off again.

Figure 5:
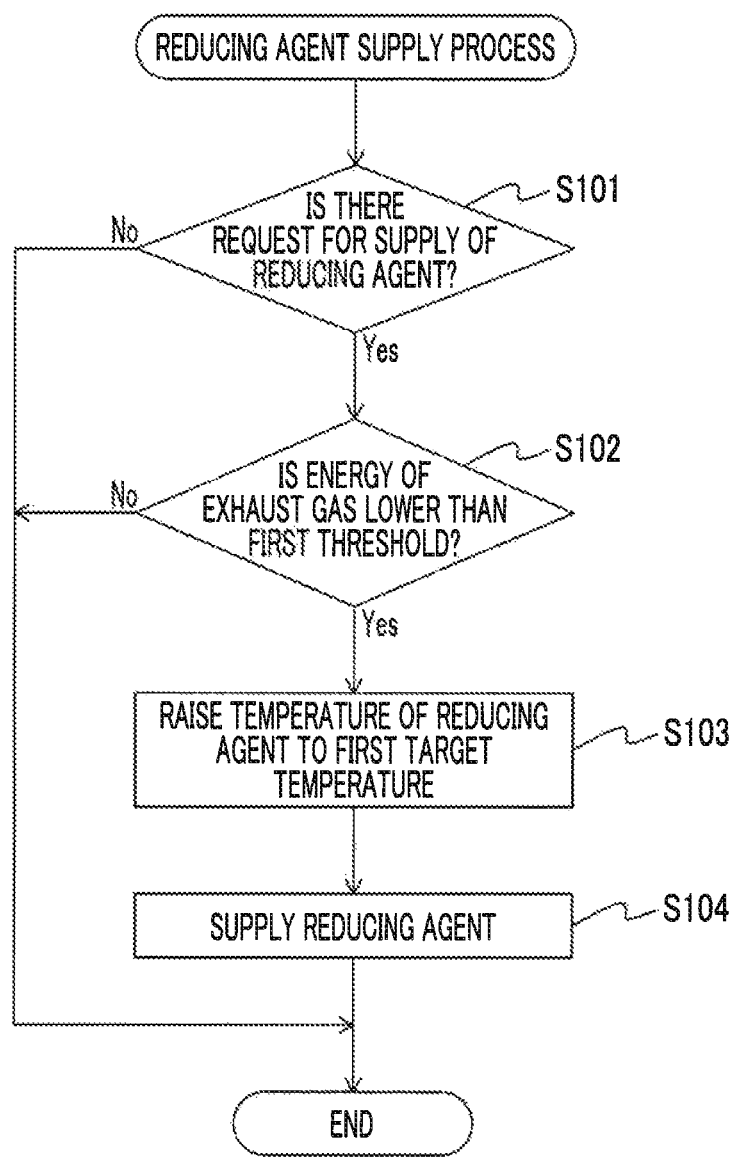
FIG. 5 is a flowchart showing a control routine of a reducing agent supply process in the first embodiment.

The control for supplying the reducing agent into the exhaust pipe 27 will be described hereinafter with reference to a flowchart of FIG. 5. FIG. 5 is a flowchart showing a control routine of a reducing agent supply process in the first embodiment. The present control routine is repeatedly executed at intervals of a predetermined time by the ECU 80, after the start of the internal combustion engine 1.

In step S101, the ECU 80 determines whether or not there is a request for the supply of the reducing agent. For example, the ECU 80 determines that there is a request for the supply of the reducing agent if an estimated value of an storing amount of NOx in the NSR catalyst 28 is equal to or larger than a predetermined value, and determines that there is no request for the supply of the reducing agent if the estimated value of the storing amount of NOx in the NSR catalyst 28 is smaller than the predetermined value. The predetermined value is a value smaller than a maximum storing amount of NOx that can be stored by the NSR catalyst 28.

Figure 6:
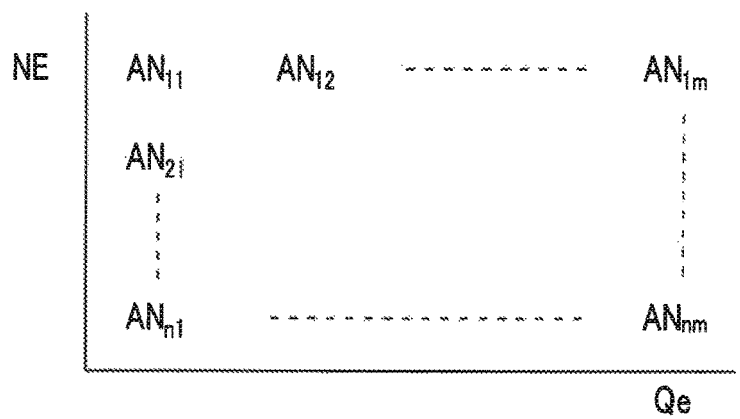
FIG. 6 is a map showing how the engine rotational speed and an amount of fuel injected from fuel injection valves are related to an amount of NOx reaching the NSR catalyst.

The storing amount of NOx in the NSR catalyst 28 is calculated by, for example, integrating an amount of NOx reaching the NSR catalyst 28. The amount of NOx reaching the NSR catalyst 28 is estimated based on an engine rotational speed and an amount of fuel injection from the fuel injection valves 3 through the use of, for example, a map or calculation formula stored in the ROM 82 of the ECU 80. In the map, as shown in FIG. 6, an amount AN of NOx reaching the NSR catalyst 28 is expressed as a function of an engine rotational speed NE and an amount Qe of fuel injection from the fuel injection valves 3.

When it is determined in step S101 that there is no request for the supply of the reducing agent, the present control routine is ended. On the other hand, when it is determined in step S101 that there is a request for the supply of the reducing agent, the present control routine proceeds to step S102.

In step S102, the ECU 80 determines whether or not the estimated energy of exhaust gas in the exhaust passage is lower than the first threshold. The first threshold is set to, for example, a lower limit of the energy of exhaust gas that is needed to partially gasify low-temperature (e.g., up to 30° C.) fuel.

The ECU 80 detects or estimates an exhaust gas temperature in the exhaust passage. The ECU 80 estimates energy of exhaust gas in the exhaust passage based on the detected or estimated exhaust gas temperature. The ECU 80 estimates the energy of exhaust gas as a value that increases as the exhaust gas temperature rises, and determines that the energy of exhaust gas is lower than the first threshold when the exhaust gas temperature is lower than a first temperature. The first temperature is a temperature corresponding to the energy of exhaust gas as the first threshold, and is equal to, for example, 200° C.

The ECU 80 detects an exhaust gas temperature in the exhaust passage by, for example, an exhaust gas temperature sensor 36 that is arranged in the exhaust passage. In the present embodiment, the exhaust gas temperature sensor 36 is arranged in the exhaust passage upstream of the NSR catalyst 28 in the flow direction of exhaust gas. In concrete terms, the exhaust gas temperature sensor 36 is arranged in the exhaust pipe 27 between the turbine 7b of the turbocharger 7 and the NSR catalyst 28.

Figure 7:
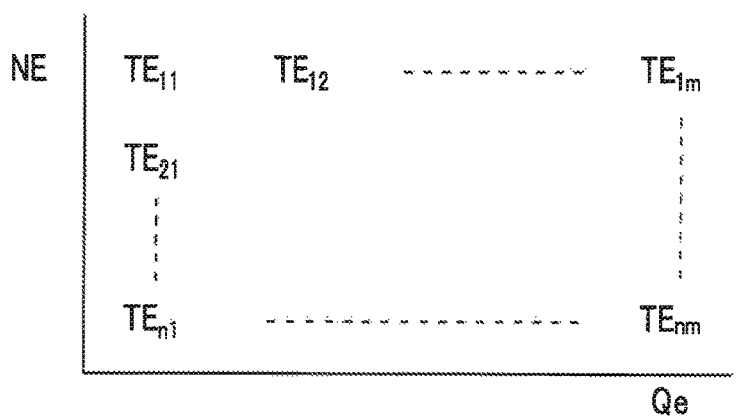
FIG. 7 is a map showing how the engine rotational speed and the amount of fuel injected from the fuel injection valves are related to an exhaust gas temperature in an exhaust passage.

Incidentally, the ECU 80 may estimate the exhaust gas temperature in the exhaust passage based on the engine rotational speed and the amount of fuel injection from the fuel injection valves 3, through the use of the map or calculation formula stored in the ROM 82 of the ECU 80. In the map, as shown in FIG. 7, a temperature TE of exhaust gas in the exhaust passage is expressed as a function of the engine rotational speed NE and the amount Qe of fuel injection from the fuel injection valves 3.

Figure 8:
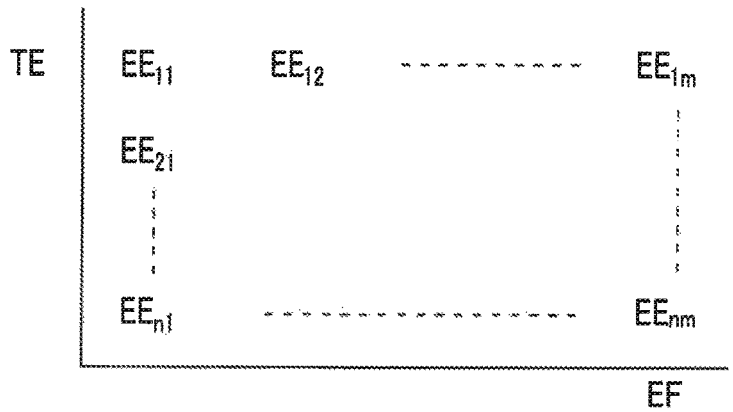
FIG. 8 is a map showing how the exhaust gas temperature in the exhaust passage and a flow rate of exhaust gas are related to energy of exhaust gas in the exhaust passage.

Besides, the ECU 80 may estimate a flow rate of exhaust gas in the exhaust passage, and estimate the energy of exhaust gas in the exhaust passage based on the detected or estimated exhaust gas temperature and the estimated flow rate of exhaust 16 gas, through the use of the map or calculation formula stored in the ROM 82 of the ECU 80. In this case, there is no need to provide the internal combustion engine 1 with the exhaust gas temperature sensor 36. The ECU 80 estimates the flow rate of exhaust gas in the exhaust passage based on, for example, an intake air amount detected by the airflow meter 102. In the map, as shown in FIG. 8, an energy EE of exhaust gas in the exhaust passage is expressed as a function of the temperature TE of exhaust gas in the exhaust passage and a flow rate EF of exhaust gas in the exhaust passage.

When it is determined in step S102 that the energy of exhaust gas is higher than the first threshold, the present control routine is ended. On the other hand, when it is determined in step S102 that the energy of exhaust gas is lower than the first threshold, the present control routine proceeds to step S103.

In step S103, the ECU 80 raises the temperature of the reducing agent to the first target temperature by the heater 34, such that the reducing agent supplied by the reducing agent supply device 35 is brought into a gas-liquid mixed state in the exhaust passage. The first target temperature is set to a temperature at which the fuel supplied into the exhaust passage is brought into a gas-liquid mixed state in the exhaust passage, namely, a temperature within the temperature range between the highest boiling point and lowest boiling point of fuel at the pressure in the exhaust passage. In the case where the reducing agent is light oil, the first target temperature is, for example, 180 to 350° C.

Subsequently in step S104, the ECU 80 supplies the reducing agent to the exhaust passage by the reducing agent supply device 35, so as to supply the reducing agent to the NSR catalyst 28. After step S104, the present control routine is ended.

The exhaust gas control apparatus for the internal combustion engine according to the second embodiment is basically identical to the exhaust gas control apparatus for the internal combustion engine according to the first embodiment, except in the following respects. Therefore, the second embodiment will be described hereinafter, focusing on what is different from the first embodiment.

As is apparent from FIG. 4, a certain time (from t1 to t2) is needed to raise the temperature of the reducing agent to the first target temperature. Therefore, the time from a timing when a request for the supply of the reducing agent is made to a timing when the temperature of the reducing agent is raised to the first target temperature becomes long. As a result, it may be impossible to supply the reducing agent into the exhaust pipe 27 at an appropriate timing.

Thus, in the second embodiment, the ECU 80 gradually raises the temperature of the reducing agent in raising the temperature of the reducing agent to the first target temperature. For example, the ECU 80 raises the temperature of the reducing agent to a predetermined temperature when the supply of the reducing agent is announced, and raises the temperature of the reducing agent from the predetermined temperature to the first target temperature when the supply of the reducing agent is requested. Thus, in the second embodiment, the responsiveness to the request for the supply of the reducing agent can be enhanced.

Figure 9:
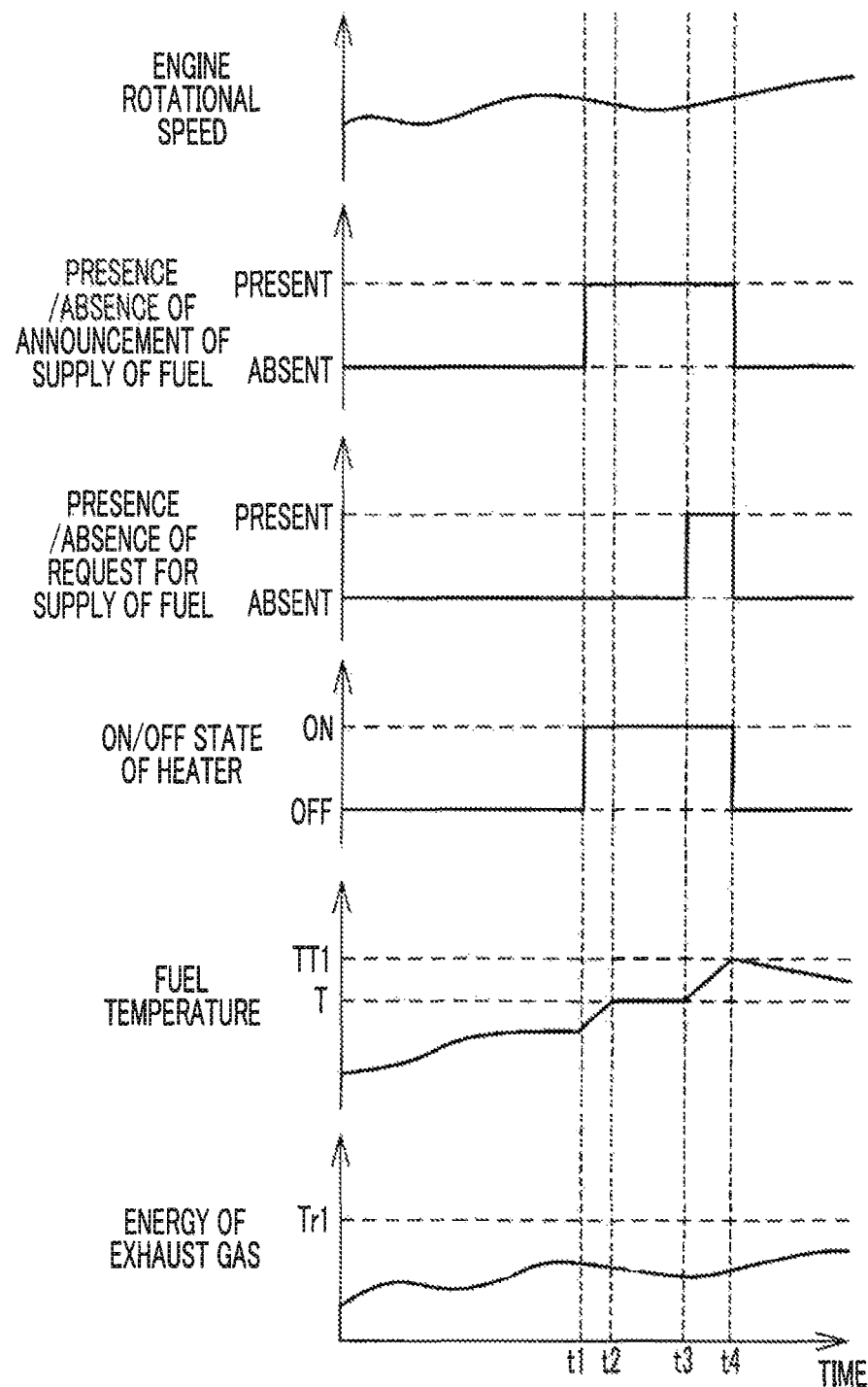
FIG. 9 is a time chart of the engine rotational speed and the like in supplying fuel into the exhaust pipe.

The control of the exhaust gas control apparatus for the internal combustion engine 1 according to the second embodiment will be concretely described hereinafter. FIG. 9 is a schematic time chart showing the engine rotational speed, the presence/absence of an announcement of the supply of fuel, the presence/absence of a request for the supply of fuel, the on/off state of the heater 34, the temperature of fuel, and the energy of exhaust gas in supplying fuel into the exhaust pipe 27.

In the illustrated example, the supply of fuel into the exhaust pipe 27 is announced at the time point t1. Therefore, the heater 34 is turned on to raise the temperature of fuel to a predetermined temperature T at the time point t1. As a result, the temperature of fuel reaches the predetermined temperature T at the time point t2. After reaching the predetermined temperature T, the temperature of fuel is held equal to the predetermined temperature T.

After that, the supply of fuel into the exhaust pipe 27 is requested at a time point t3. The energy of exhaust gas in the exhaust pipe 27 is lower than the first threshold Tr1 at the time point t3. Therefore, the amount of energization of the heater 34 is increased at the time point t3 to raise the temperature of fuel to the first target temperature TT1. As a result, the temperature of fuel reaches the first target temperature TT1 at a time point t4.

Fuel is supplied into the exhaust pipe 27 by the reducing agent supply device 35 at the time point t4. Part of the fuel supplied into the exhaust pipe 27 is boiled under reduced pressure in the exhaust pipe 27. As a result, the fuel in a gas-liquid mixed state is supplied to the NSR catalyst 28. When the supply of fuel into the exhaust pipe 27 is ended, the heater 34 is turned off again.

Figure 10:
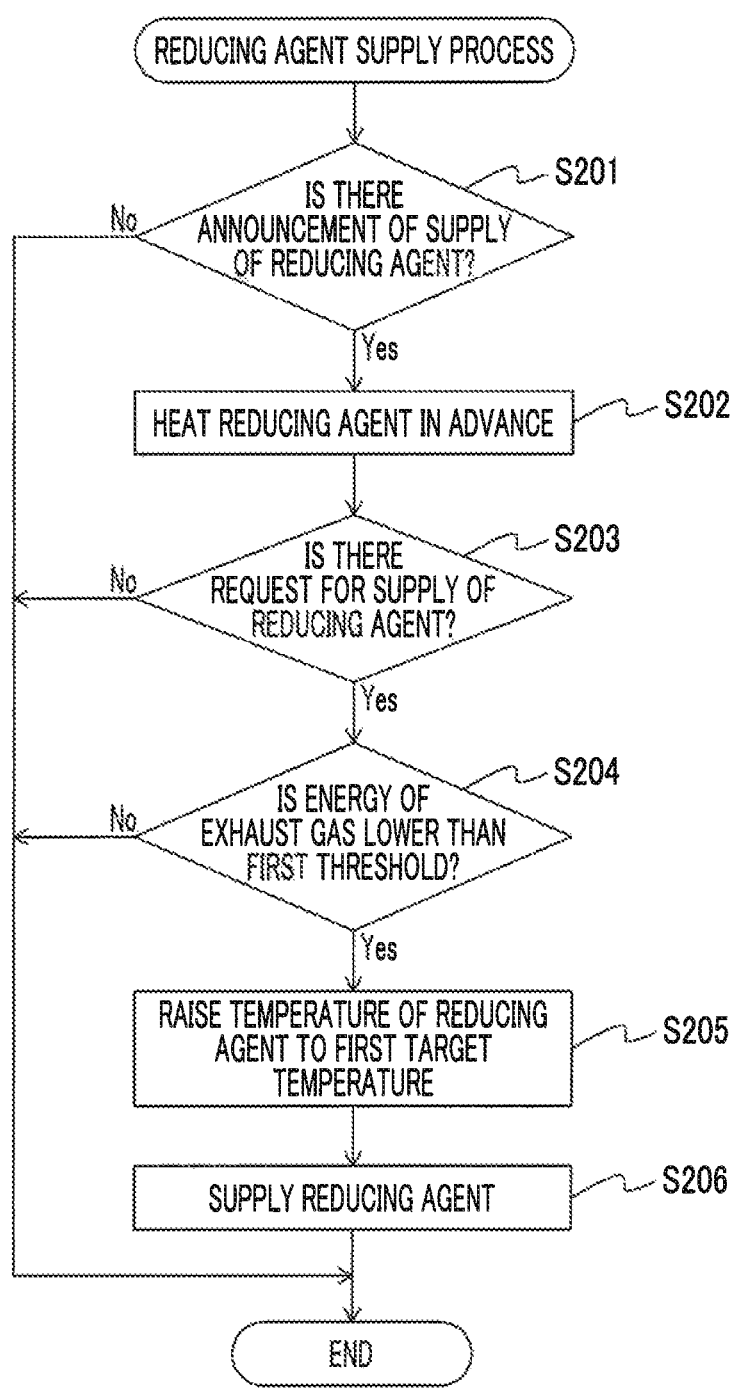
FIG. 10 is a flowchart showing a control routine of a reducing agent supply process in the second embodiment.

FIG. 10 is a flowchart showing a control routine of a reducing agent supply process in the second embodiment. The present control routine is repeatedly executed at intervals of a predetermined time by the ECU 80, after the start of the internal combustion engine 1.

In step S101, the ECU 80 determines whether or not there is an announcement of the supply of the reducing agent. The ECU 80 determines that there is an announcement of the supply of the reducing agent when the estimated value of the storing amount of NOx in the NSR catalyst 28 is equal to or larger than a first storing amount, and determines that there is no announcement of the supply of the reducing agent when the estimated value of the storing amount of NOx in the NSR catalyst 28 is smaller than the first storing amount. The first storing amount is a value smaller than a maximum storing amount of NOx that can be stored by the NSR catalyst 28.

When it is determined in step S201 that there is no announcement of the supply of the reducing agent, the present control routine is ended. On the other hand, when it is determined in step S201 that there is an announcement of the supply of the reducing agent, the present control routine proceeds to step S202.

In step S202, the ECU 80 heats the reducing agent in advance by the heater 34. In concrete terms, the ECU 80 raises the temperature of the reducing agent to the predetermined temperature by the heater 34. The predetermined temperature is a temperature lower than the first target temperature. In the case where the reducing agent is light oil, the predetermined temperature is, for example, 80 to 100° C.

Subsequently in step S203, the ECU 80 determines whether or not there is a request for the supply of the reducing agent. The ECU 80 determines that there is a request for the supply of the reducing agent when the estimated value of the storing amount of NOx in the NSR catalyst 28 is equal to or larger than a second storing amount, and determines that there is no request for the supply of the reducing agent when the estimated value of the storing amount of NOx in the NSR catalyst 28 is smaller than the second storing amount. The second storing amount is a value smaller than the maximum storing amount of NOx that can be stored by the NSR catalyst 28 and larger than the first storing amount.

Steps S204 to S206 are identical to steps S102 to S104 in FIG. 5 respectively, so the description thereof will be omitted.

The exhaust gas control apparatus for the internal combustion engine according to the third embodiment is basically identical to the exhaust gas control apparatus for the internal combustion engine according to the first embodiment, except in the following respects. Therefore, the third embodiment will be described hereinafter, focusing on what is different from the first embodiment.

In the case where the energy of exhaust gas in the exhaust passage is larger than the first threshold, the reducing agent can be partially gasified by the energy of exhaust gas, so there is no need to boil the reducing agent under reduced pressure. However, in the case where the reducing agent is not heated by the heater 34, the viscosity of the reducing agent is high, and the particle diameter of the reducing agent supplied into the exhaust pipe 27 is large. As a result, the reducing agent is restrained from being gasified by the energy of exhaust gas. Therefore, even in the case where the energy of exhaust gas in the exhaust passage is larger than the first threshold, when the energy of exhaust gas is relatively low, it is desirable to heat the reducing agent to accelerate atomization of the reducing agent.

Thus, in the third embodiment, the ECU 80 raises the temperature of the reducing agent to a second target temperature lower than the first target temperature, when the estimated energy of exhaust gas is equal to or higher than the first threshold and lower than a second threshold. Thus, the reducing agent is heated in accordance with the energy of exhaust gas, and the reducing agent can be more reliably rendered in a gas-liquid mixed state.

Figure 11:
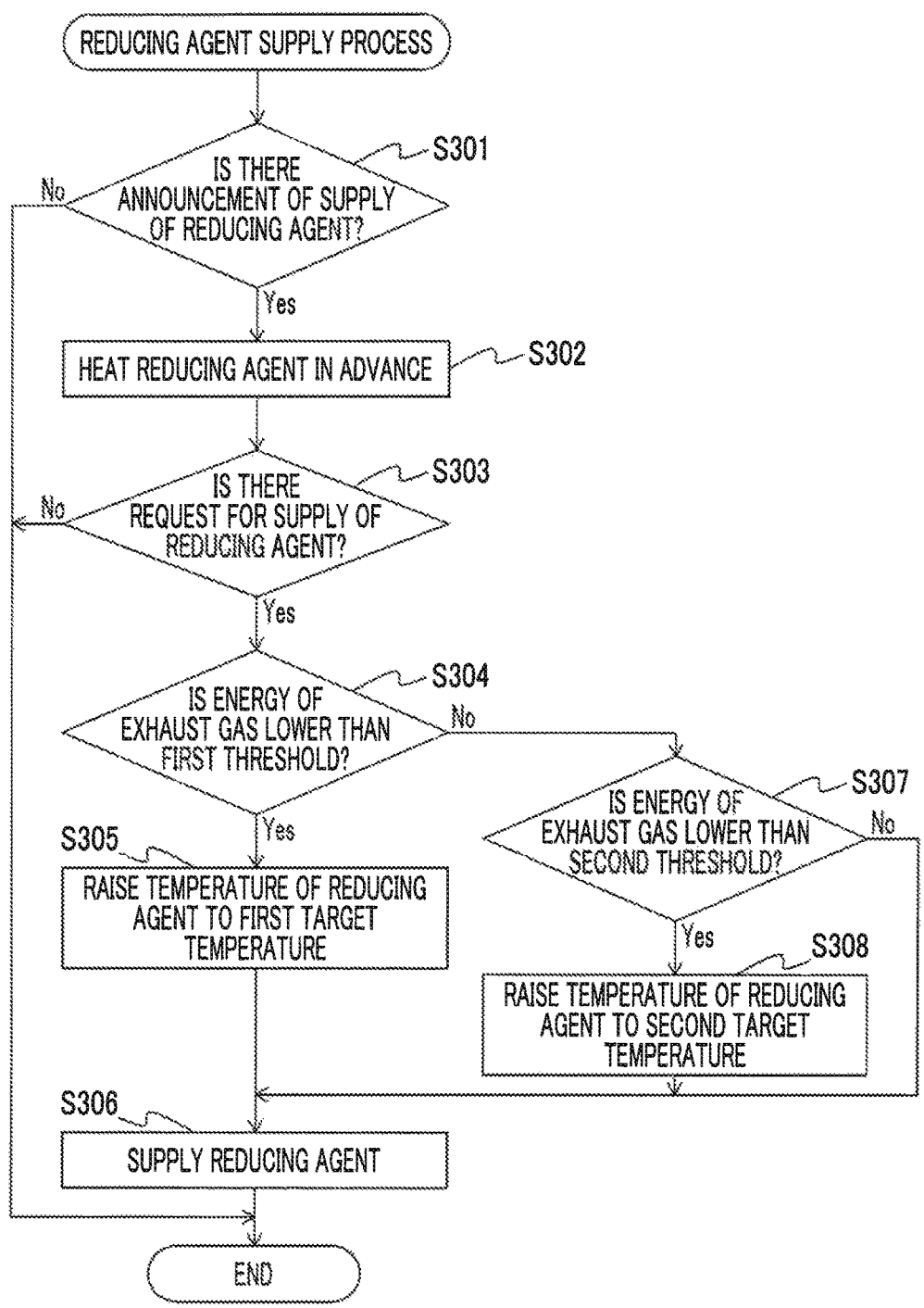
FIG. 11 is a flowchart showing a control routine of a reducing agent supply process in the third embodiment.

FIG. 11 is a flowchart showing a control routine of a reducing agent supply process in the third embodiment. The present control routine is repeatedly executed at intervals of a predetermined time by the ECU 80, after the start of the internal combustion engine 1.

Steps S301 to S306 are identical to steps S201 to S206 in FIG. 10 respectively, so the description thereof will be omitted.

The present control routine proceeds to step S307 when it is determined in step S304 that the energy of exhaust gas is equal to or higher than the first threshold. In step S307, the ECU 80 determines whether or not the estimated energy of exhaust gas in the exhaust passage is lower than the second threshold. The second threshold is a value higher than the first threshold. The ECU 80 determines that the energy of exhaust gas is lower than the second threshold, for example, when the exhaust gas temperature is lower than a second temperature. The second temperature is a temperature higher than the first temperature, and is equal to, for example, 250° C.

When it is determined in step S307 that the energy of exhaust gas is equal to or higher than the second threshold, the present control routine proceeds to step S306, and the reducing agent is supplied to the exhaust passage. On the other hand, when it is determined in step S307 that the energy of exhaust gas is lower than the second threshold, the present control routine proceeds to step S308.

In step S308, the ECU 80 raises the temperature of the reducing agent to the second target temperature lower than the first target temperature, by the heater 34. The second target temperature is set to a temperature at which atomization of the reducing agent is accelerated. In the case where the reducing agent is light oil, the second target temperature is, for example, 100 to 150° C. After step S308, the reducing agent is supplied to the exhaust passage in step S306. After step S306, the present control routine is ended.

Step S301 and step S302 may be omitted in the present control routine.

At least one of the first threshold, the first target temperature, the second threshold, and the second target temperature may be corrected based on the atmospheric pressure. For example, in the case where the atmospheric pressure is relatively low at high altitudes or the like, the temperature range where the reducing agent is boiled under reduced pressure is low. Therefore, the ECU 80 may set at least one of the first threshold and the first target temperature lower when the atmospheric pressure is relatively low than when the atmospheric pressure is relatively high. By the same token, the ECU 80 may set at least one of the second target temperature and the second threshold lower when the atmospheric pressure is relatively low than when the atmospheric pressure is relatively high. The ECU 80 detects an atmospheric pressure by, for example, an atmospheric pressure sensor that is provided in the internal combustion engine 1. The ECU 80 may 26 estimate the atmospheric pressure based on the pressure in the intake pipe 6 or the like.

The exhaust gas control apparatus for the internal combustion engine according to the fourth embodiment is basically identical to the exhaust gas control apparatus for the internal combustion engine according to the first embodiment, except in the following respects. Therefore, the fourth embodiment will be described hereinafter, focusing on what is different from the first embodiment.

As described above, the ECU 80 raises the temperature of the reducing agent to the first target temperature when the energy of exhaust gas in the exhaust passage is lower than the first threshold. However, a certain time is needed to raise the temperature of the reducing agent, so the energy of exhaust gas in the exhaust passage may be equal to or higher than the first threshold when the temperature of the reducing agent rises to the first target temperature. In this case, when the reducing agent at the first target temperature is supplied into the exhaust passage, the entire reducing agent that has been supplied may be gasified through the boiling of the reducing agent under reduced pressure and the energy of exhaust gas in the exhaust passage.

Thus, in the fourth embodiment, the ECU 80 supplies the reducing agent at the first target temperature to the exhaust passage and further supplies the reducing agent below the first target temperature to the exhaust passage, when the estimated energy of exhaust gas becomes equal to or higher than the first threshold after the temperature of the reducing agent rises to the first target temperature. In concrete terms, the ECU 80 supplies the exhaust passage with the reducing agent that has not been heated by the heater 34 or the reducing agent that has been heated to a temperature lower than the first target temperature by the heater 34, as well as the reducing agent at the first target temperature, by increasing the supply amount of the reducing agent. Thus, even in the case where the energy of exhaust gas excessively rises while the temperature of the reducing agent rises, the reducing agent in a gas-liquid mixed state can be supplied to the NSR catalyst 28.

Figure 12:
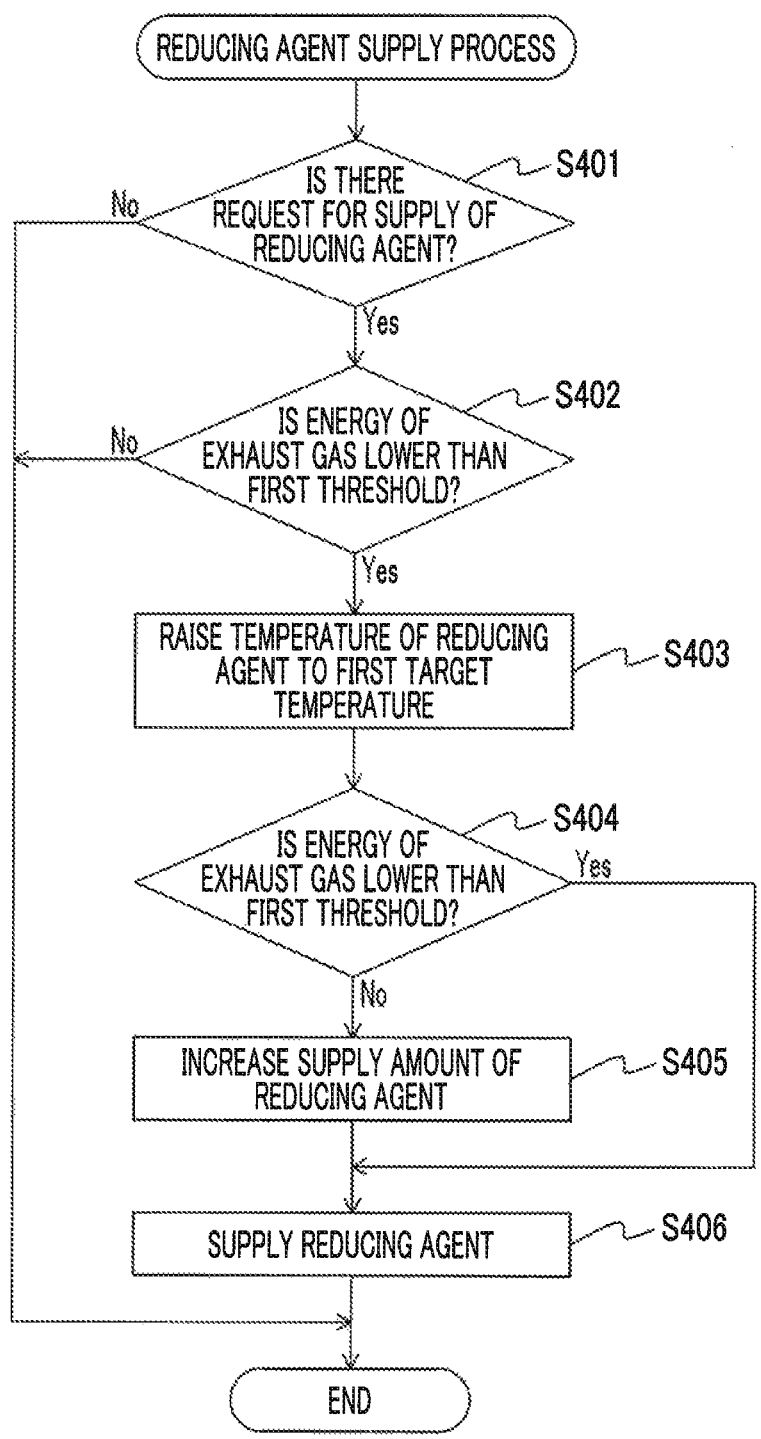
FIG. 12 is a flowchart showing a control routine of a reducing agent supply process in the fourth embodiment.

FIG. 12 is a flowchart showing a control routine of a reducing agent supply process in the fourth embodiment. The present control routine is repeatedly executed at intervals of a predetermined time by the ECU 80, after the start of the internal combustion engine 1.

Steps S401 to S403 are identical to steps S101 to steps S103 in FIG. 5 respectively, so the description thereof will be omitted.

The present control routine proceeds to step S404 after step S403. In step S404 as well as step S402, the ECU 80 determines whether or not the energy of exhaust gas in the exhaust passage estimated by the ECU 80 is lower than the first threshold.

When it is determined in step S404 that the energy of exhaust gas is lower than the first threshold, the present control routine proceeds to step S406, and the reducing agent is supplied to the exhaust passage. On the other hand, when it is determined in step S404 that the energy of exhaust gas is equal to or higher than the first threshold, the present control routine proceeds to step S405.

In step S405, the ECU 80 increases the supply amount of the reducing agent to supply the exhaust passage with the reducing agent below the first target temperature as well as the reducing agent at the first target temperature. After step S405, the reducing agent is supplied to the exhaust passage in step S406. After step S406, the present control routine is ended.

Although the preferred embodiments have been described hereinbefore, the disclosure is not limited to these embodiments thereof, but can be subjected to various modifications and alterations within the range of what is set forth in the claims. For example, a fuel such as biodiesel fuel (BDF) may be used as the reducing agent. The NOx reduction catalyst may be a NOx selective catalytic reduction catalyst (an SCR catalyst). In this case, urea water is used as the reducing agent. Incidentally, the first target temperature, the first threshold, the second target temperature, and the second threshold are set to appropriate values in accordance with the characteristics of the reducing agent such that the reducing agent assumes a gas-liquid mixed state in the exhaust passage.

The aforementioned embodiments can be carried out by being combined with one another arbitrarily. For example, steps S404 and S405 in FIG. 12 may be carried out between steps S205 and S206 in FIG. 10 or between steps S305 and S306 in FIG. 11.

What is claimed is:

1. An exhaust gas control apparatus for an internal combustion engine, comprising:
    a NOx reduction catalyst arranged in an exhaust passage of the internal combustion engine;
    a reducing agent tank that stores a reducing agent;
    a reducing agent supply device configured to supply the reducing agent to the exhaust passage upstream of the NOx reduction catalyst in a flow direction of exhaust gas;
    a booster configured to boost a pressure of the reducing agent supplied to the reducing agent supply device from the reducing agent tank to a pressure higher than a pressure in the exhaust passage;
    a heater configured to heat the reducing agent supplied to the reducing agent supply device from the reducing agent tank; and
    an electronic control unit configured to control a temperature of the reducing agent by the heater,
    the electronic control unit being configured to estimate energy of exhaust gas in the exhaust passage,
    the electronic control unit being configured to perform control of raising the temperature of the reducing agent to a first target temperature such that the reducing agent supplied by the reducing agent supply device is brought into a gas-liquid mixed state in the exhaust passage, when the energy of exhaust gas is lower than a first threshold, and
    the electronic control unit being configured to raise the temperature of the reducing agent to a second target temperature when the energy of exhaust gas is equal to or higher than the first threshold and lower than a second threshold, the second target temperature being lower than the first target temperature.

2. The exhaust gas control apparatus according to claim 1, wherein
    the electronic control unit is configured to execute one of detecting and estimating an exhaust gas temperature in the exhaust passage, and
    the electronic control unit is configured to estimate the energy of exhaust gas in the exhaust passage based on the exhaust gas temperature.

3. The exhaust gas control apparatus according to claim 2, wherein
    the electronic control unit is configured to estimate a flow rate of exhaust gas in the exhaust passage, and
    the electronic control unit is configured to estimate the energy of exhaust gas in the exhaust passage based on the exhaust gas temperature and the flow rate of exhaust gas.

4. The exhaust gas control apparatus according to claim 1, wherein
    the electronic control unit is configured to control supply of the reducing agent by the reducing agent supply device, and
    when the energy of exhaust gas becomes equal to or higher than the first threshold after the temperature of the reducing agent rises to the first target temperature, the electronic control unit is configured to supply the reducing agent at the first target temperature to the exhaust passage and supply the reducing agent below the first target temperature to the exhaust passage.

5. An exhaust gas control apparatus for an internal combustion engine, comprising:
    a NOx reduction catalyst arranged in an exhaust passage of the internal combustion engine;
    a reducing agent tank that stores a reducing agent;
    a reducing agent supply device configured to supply the reducing agent to the exhaust passage upstream of the NOx reduction catalyst in a flow direction of exhaust gas;
    a booster configured to boost a pressure of the reducing agent supplied to the reducing agent supply device from the reducing agent tank to a pressure higher than a pressure in the exhaust passage;
    a heater configured to heat the reducing agent supplied to the reducing agent supply device from the reducing agent tank; and
    an electronic control unit configured to control a temperature of the reducing agent by the heater,
    the electronic control unit being configured to estimate energy of exhaust gas in the exhaust passage,
    the electronic control unit being configured to perform control of raising the temperature of the reducing agent to a first target temperature such that the reducing agent supplied by the reducing agent supply device is brought into a gas-liquid mixed state in the exhaust passage, when the energy of exhaust gas is lower than a first threshold,
    the electronic control unit being configured to execute one of detecting and estimating an atmospheric pressure, and
    the electronic control unit being configured to set at least one of the first target temperature and the first threshold lower when the atmospheric pressure is relatively low than when the atmospheric pressure is relatively high.

6. A control method for an exhaust gas control apparatus, the exhaust gas control apparatus being provided in an internal combustion engine, the exhaust gas control apparatus including a NOx reduction catalyst, a reducing agent tank, a reducing agent supply device, a booster, a heater, and an electronic control unit, the NOx reduction catalyst being arranged in an exhaust passage of the internal combustion engine, the reducing agent tank that stores a reducing agent, the reducing agent supply device being configured to supply the reducing agent to the exhaust passage upstream of the NOx reduction catalyst in a flow direction of exhaust gas, the booster being configured to boost a pressure of the reducing agent supplied to the reducing agent supply device from the reducing agent tank to a pressure higher than a pressure in the exhaust passage, and the heater being configured to heat the reducing agent supplied to the reducing agent supply device from the reducing agent tank,
    the control method comprising:
    controlling a temperature of the reducing agent by the heater;
    estimating energy of exhaust gas in the exhaust passage by the electronic control unit,
    controlling, by the electronic control unit, the heater to raise the temperature of the reducing agent to a first target temperature such that the reducing agent supplied by the reducing agent supply device is brought into a gas-liquid mixed state in the exhaust passage, when the energy of exhaust gas is lower than a first threshold, and controlling, by the electronic control unit, the heater to raise the temperature of the reducing agent to a second target temperature when the energy of exhaust gas is equal to or higher than the first threshold and lower than a second threshold, the second target temperature being lower than the first target temperature.

* * * * *